United States Patent
Suwa et al.

(10) Patent No.: US 9,340,660 B2
(45) Date of Patent: May 17, 2016

(54) POLY(3-HYDROXYALKANOATE) RESIN COMPOSITION

(71) Applicant: NISSAN CHEMICAL INDUSTRIES, LTD., Tokyo (JP)

(72) Inventors: Takeshi Suwa, Funabashi (JP); Kazutoshi Odaka, Funabashi (JP); Hisato Hayashi, Funabashi (JP); Masaaki Ozawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/348,204

(22) PCT Filed: Sep. 28, 2012

(86) PCT No.: PCT/JP2012/075122
§ 371 (c)(1),
(2) Date: Apr. 9, 2014

(87) PCT Pub. No.: WO2013/047766
PCT Pub. Date: Apr. 4, 2013

(65) Prior Publication Data
US 2014/0235771 A1    Aug. 21, 2014

(30) Foreign Application Priority Data
Sep. 30, 2011   (JP) ................. 2011-217233

(51) Int. Cl.
| | | |
|---|---|---|
| C08K 5/524 | (2006.01) | |
| C08K 5/53 | (2006.01) | |
| C08K 5/5317 | (2006.01) | |
| C08L 67/04 | (2006.01) | |
| C08L 101/16 | (2006.01) | |

(52) U.S. Cl.
CPC ............. *C08K 5/53* (2013.01); *C08K 5/5317* (2013.01); *C08L 67/04* (2013.01); *C08L 101/16* (2013.01)

(58) Field of Classification Search
USPC ........................................................ 524/128
See application file for complete search history.

(56) References Cited

U.S. PATENT DOCUMENTS

| | | | |
|---|---|---|---|
| 5,061,743 A | * | 10/1991 | Herring et al. ................ 524/130 |
| 2011/0196077 A1 | * | 8/2011 | Suwa et al. ................... 524/132 |

FOREIGN PATENT DOCUMENTS

| | | |
|---|---|---|
| JP | A-3-24151 | 2/1991 |
| JP | A-2009-096849 | 5/2009 |
| JP | A-2009-179773 | 8/2009 |
| JP | A-2010-47732 | 3/2010 |
| JP | A-2010-142985 | 7/2010 |
| JP | A-2010-143978 | 7/2010 |
| JP | A-2010-166900 | 8/2010 |
| JP | A-2011-38219 | 2/2011 |
| JP | A-2011-117109 | 6/2011 |
| WO | WO 2008/044471 A1 | 4/2008 |
| WO | WO 2008/099586 A1 | 8/2008 |
| WO | WO 2009/113288 | 9/2009 |

OTHER PUBLICATIONS

Written Opinion of the International Searching Authority issued in PCT/JP2012/075122 mailed on Oct. 23, 2012.
International Search Report issued in PCT/JP2012/075122 mailed Oct. 23, 2012.
Yu et al., "Nucleation Effect of Layered Metal Phosphonate on Crystallization of Bacterial Poly[(3-hydroxybutyrate)-co-(3-hydroxyhexanoate)],"*Macromolecular Materials and Engineering*, 2011, vol. 296, pp. 103-112.

* cited by examiner

*Primary Examiner* — Hui Chin
(74) *Attorney, Agent, or Firm* — Oliff PLC

(57) ABSTRACT

There is provided a P3HA resin composition to which a crystal nucleating agent suitable for the promotion of the crystallization of a P3HA resin is added. A poly(3-hydroxyalkanoate) resin composition comprising: a poly(3-hydroxyalkanoate) resin; and a metal salt of a phenylphosphonic acid compound of Formula [1]:

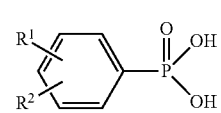

[1]

(where $R^1$ and $R^2$ are each independently a hydrogen atom, a $C_{1-10}$ alkyl group, or a $C_{2-11}$ alkoxycarbonyl group), wherein the metal salt is at least one selected from the group consisting of a lithium salt, a sodium salt, a potassium salt, a magnesium salt, a calcium salt, a barium salt, a manganese salt, an iron salt, a cobalt salt, a nickel salt, a copper salt, a silver salt, an aluminum salt, and a tin salt.

2 Claims, No Drawings

POLY(3-HYDROXYALKANOATE) RESIN COMPOSITION

TECHNICAL FIELD

The present invention relates to a poly(3-hydroxyalkanoate) resin composition, and in more detail, relates to a resin composition containing a poly(3-hydroxyalkanoate) resin and a metal salt of a phenylphosphonic acid compound.

BACKGROUND ART

From the viewpoint of protecting natural environments, researches are vigorously conducted on aliphatic polyesters that can biologically decompose in the natural environment. Among these, a poly(3-hydroxyalkanoate) (hereinafter also called P3HA) resin is known as a polymer produced by microorganisms and is attracting attention because of having excellent biodegradability. In recent years, the resin is desired to be used for a long term as, not only simply having biodegradability, a carbon fixation material that reduces carbon dioxide in the atmosphere. However, it is pointed out that because P3HA has a low crystallization rate, it takes time to solidify P3HA from the molten state during a molding process, which decreases productivity.

As a method for resolving such a problem, a method of adding a crystal nucleating agent is known, for example. The crystal nucleating agent is a primary crystal nucleus of a crystalline polymer to promote crystal growth, and therefore functions to make a crystal size finer and increase a crystallization rate.

Disclosed crystal nucleating agents for P3HA include inorganic particles such as talc, boron nitride, and calcium carbonate (Patent Document 1), sugar alcohol compounds of a specific formula (Patent Document 2), amino acids of a specific formula (Patent Document 3), amide compounds of a specific formula (Patent Document 4), and organic phosphonic acids or organic phosphinic acids, or esters or metal salts thereof, or derivatives thereof (Patent Document 5). It is also known that a zinc salt of phenylphosphonic acid of a specific formula is effective (Non-Patent Document 1).

Although these methods can increase a crystallization rate and increase crystallinity, development of a more effective crystal nucleating agent has been recently desired in order to achieve higher moldability and thermal resistance.

PRIOR ART DOCUMENTS

Patent Documents

Patent Document 1: Japanese Patent Application Publication No. 2009-96849 (JP 2009-96849 A)
Patent Document 2: WO 2008/099586 pamphlet
Patent Document 3: WO 2009/113288 pamphlet
Patent Document 4: Japanese Patent Application Publication No. 2010-47732 (JP 2010-47732 A)
Patent Document 5: Japanese Patent Application Publication No. H03-24151 (JP H03-24151 A)

Non-Patent Documents

Non-Patent Document 1: Macromol. Mater. Eng., 296, p 103 (2011)

SUMMARY OF THE INVENTION

Problem to be Solved by the Invention

As described above, an effective crystal nucleating agent is desired to be developed that is effective in improving moldability and thermal resistance in order to manufacture a P3HA resin molded product with high productivity and use the product in a wide range of applications.

An object of the present invention is therefore to provide a P3HA resin composition to which a crystal nucleating agent suitable for the promotion of the crystallization of a P3HA resin is added.

Means for Solving the Problem

As a result of assiduous study for resolving the above problem, the inventors of the present invention have found out that certain types of metal salts of a phenylphosphonic acid compound dramatically increase the crystallization rate of the P3HA resin and have achieved the present invention.

The present invention relates to, as a first aspect, a poly(3-hydroxyalkanoate) resin composition comprising: a poly(3-hydroxyalkanoate) resin; and a metal salt of a phenylphosphonic acid compound of Formula [1]:

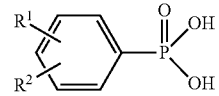

[1]

(where $R^1$ and $R^2$ are each independently a hydrogen atom, a $C_{1-10}$ alkyl group, or a $C_{2-11}$ alkoxycarbonyl group), in which the metal salt is at least one selected from the group consisting of a lithium salt, a sodium salt, a potassium salt, a magnesium salt, a calcium salt, a barium salt, a manganese salt, an iron salt, a cobalt salt, a nickel salt, a copper salt, a silver salt, an aluminum salt, and a tin salt.

The present invention relates to, as a second aspect, the poly(3-hydroxyalkanoate) resin composition according to the first aspect, in which the poly(3-hydroxyalkanoate) resin is a homopolymer of 3-hydroxybutyrate or a copolymer of at least one monomer selected from the group consisting of 3-hydroxypropionate, 3-hydroxyvalerate, 3-hydroxyhexanoate, 3-hydroxyheptanoate, 3-hydroxyoctanoate, 3-hydroxynonanoate, 3-hydroxydecanoate, 3-hydroxydodecanoate, 3-hydroxydodecenoate, 3-hydroxytetradecanoate, 3-hydroxyhexadodecanoate, 3-hydroxyoctadodecanoate, and 4-hydroxybutyrate, with 3-hydroxybutyrate.

The present invention relates to, as a third aspect, the poly(3-hydroxyalkanoate) resin composition according to the second aspect, in which the poly(3-hydroxyalkanoate) resin is a homopolymer of 3-hydroxybutyrate or a copolymer of at least one monomer selected from the group consisting of 3-hydroxypropionate, 3-hydroxyvalerate, 3-hydroxyhexanoate, 3-hydroxyheptanoate, 3-hydroxyoctanoate, and 4-hydroxybutyrate, with 3-hydroxybutyrate.

The present invention relates to, as a fourth aspect, the poly(3-hydroxyalkanoate) resin composition according to any one of the first to third aspects, in which the metal salt is at least one selected from the group consisting of a lithium salt, a potassium salt, a magnesium salt, a calcium salt, a manganese salt, an iron salt, a cobalt salt, a nickel salt, a silver salt, an aluminum salt, and a tin salt.

The present invention relates to, as a fifth aspect, the poly(3-hydroxyalkanoate) resin composition according to the fourth aspect, in which the metal salt is at least one selected from the group consisting of a magnesium salt, a calcium salt, a manganese salt, a cobalt salt, and a silver salt.

The present invention relates to, as a sixth aspect, the poly(3-hydroxyalkanoate) resin composition according to any one of the first to fifth aspects, in which the metal salt of the phenylphosphonic acid compound is contained in an amount of 0.01 to 10 parts by mass with respect to 100 parts by mass of the poly(3-hydroxyalkanoate) resin.

Effects of the Invention

The poly(3-hydroxyalkanoate) resin composition according to the present invention includes the specific metal salt of the phenylphosphonic acid compound as the crystal nucleating agent, thereby improving the crystallization promotion effect of the poly(3-hydroxyalkanoate) resin and thus enabling provision of a poly(3-hydroxyalkanoate) resin composition excellent in heat resistance and moldability.

MODES FOR CARRYING OUT THE INVENTION

Poly(3-Hydroxyalkanoate) Resin

A P3HA resin used in the present invention includes homopolymers and copolymers of P3HA. The P3HA resin may be a blend polymer with other resins with a homopolymer or copolymer of P3HA as a main component. Examples of the other resin include biodegradable resins other than the P3HA resins, general-purpose synthetic resins, and general-purpose synthetic engineering plastics, which are described below. When the P3HA resin is a copolymer, the arrangement manner of the copolymer may be any of a random copolymer, an alternating copolymer, a block copolymer, and a graft copolymer.

Examples of the monomer constituting the homopolymer and the copolymer of P3HA include 3-hydroxyalkanoate monomers such as 3-hydroxybutyrate, 3-hydroxypropionate, 3-hydroxyvalerate, 3-hydroxyhexanoate, 3-hydroxyheptanoate, 3-hydroxyoctanoate, 3-hydroxynonanoate, 3-hydroxydecanoate, 3-hydroxydodecanoate, 3-hydroxydodecenoate, 3-hydroxytetradecanoate, 3-hydroxyhexadodecanoate, and 3-hydroxyoctadodecanoate.

Examples of the monomer constituting the copolymer of P3HA include, in addition to the above monomers, 4-hydroxyalkanoate monomers such as 4-hydroxybutyrate and other hydroxyalkanoate monomers.

Among these, preferable are homopolymers of 3-hydroxybutyrate (poly(3-hydroxybutyrate), also called PHB), copolymers of 3-hydroxybutyrate and another 3-hydroxyalkanoate monomer, and copolymers of 3-hydroxybutyrate and a 4-hydroxyalkanoate monomer.

Among the copolymers of 3-hydroxybutyrate and another 3-hydroxyalkanoate monomer or a 4-hydroxyalkanoate monomer, preferable are copolymers of 3-hydroxybutyrate and 3-hydroxypropionate (poly((3-hydroxybutyrate)-co-(3-hydroxypropionate))), copolymers of 3-hydroxybutyrate and 3-hydroxyvalerate (poly((3-hydroxybutyrate)-co-(3-hydroxyvalerate)), also called PHBV), copolymers of 3-hydroxybutyrate and 3-hydroxyhexanoate (poly((3-hydroxybutyrate)-co-(3-hydroxyhexanoate)), also called PHBH), copolymers of 3-hydroxybutyrate and 3-hydroxyheptanoate (poly((3-hydroxybutyrate)-co-(3-hydroxyheptanoate))), copolymers of 3-hydroxybutyrate and 3-hydroxyoctanoate (poly((3-hydroxybutyrate)-co-(3-hydroxyoctanoate))), and copolymers of 3-hydroxybutyrate and 4-hydroxybutyrate (poly((3-hydroxybutyrate)-co-(4-hydroxybutyrate)), also called P3/4HB); PHBV, PHBH, and P3/4HB are particularly preferable.

The composition ratio of 3-hydroxybutyrate in the copolymer of 3-hydroxybutyrate and another 3-hydroxyalkanoate monomer or a 4-hydroxyalkanoate monomer is appropriately selected in view of a balance between flexibility and strength as a resin; for example, the composition ratio is, in terms of the molar ratio of (3-hydroxybutyrate)/(another 3-hydroxyalkanoate monomer or a 4-hydroxyalkanoate monomer), 99/1 to 70/30 (mol/mol) and preferably 98/2 to 75/25 (mol/mol), 97/3 to 80/20 (mol/mol), 95/5 to 82/18 (mol/mol), 92/8 to 85/15 (mol/mol), and 90/10 to 85/15 (mol/mol).

The number average molecular weight of P3HA is generally about 10,000 to 500,000, whereas the weight average molecular weight thereof is generally about 50,000 to 3,000,000, although not being limited thereto. The number average molecular weight and the weight average molecular weight refer to ones measured from a molecular weight distribution in terms of polystyrene using gel permeation chromatography (GPC) using a chloroform eluate. The P3HA resin may be cross-linked with a cross-linking agent using heat, light, radiation, or the like.

The microorganisms that produce the P3HA resin include any microorganism having P3HA productivity. Known PHB-producing bacteria include natural microorganisms including *Bacillus megaterium* initially discovered in 1925, *Cupriavidus necator* (formerly classified as *Alcaligenes eutrophus, Ralstonia eutoropha*), and *Alcaligenes latus*. These microorganisms accumulate PHB within their cells.

Known bacteria producing copolymers of 3-hydroxybutyrate and another 3-hydroxyalkanoate include *Aeromonas caviae* as PHBV- and PHBH-producing bacterium. With respect to PHBH in particular, in order to increase the productivity of PHBH, more preferable microorganism include *Alcaligenes* eutrophus AC32, FERM BP-6038 (T. Fukui, Y. Doi, J. Bacteriol., 179, p 4821-4830 (1997)) with a P3HA synthase gene introduced. Microbial cells are used that are obtained by culturing these microorganisms under appropriate conditions and accumulating PHBH in the cells. Other than the above, genetically modified microorganisms may be used to which various genes associated with P3HA synthesis are introduced in accordance with any P3HA resin desired to be produced. Culturing conditions including the type of a substrate may be optimized.

Examples of the biodegradable resin other than the P3HA resin include poly(lactic acid), polycaprolactone, poly(butyrene succinate), poly(butyrene succinate/adipate), poly(butyrene succinate/carbonate), poly(ethylene succinate), poly(ethylene succinate/adipate), poly(vinyl alcohol), poly(glycolic acid), modified starch, cellulose acetate, chitin, chitosan, and lignin.

Examples of the general-purpose synthetic resin include polyolefin resins such as polyethylene (PE), polyethylene copolymers, polypropylene (PP), polypropylene copolymers, polybutyrene (PB), ethylene-vinyl acetate copolymers (EVA), ethylene-ethyl acrylate copolymers (EEA), and poly(4-methyl-1-pentene); polystyrene resins such as polystyrene (PS), high impact polystyrene (HIPS), acrylonitrile-styrene copolymers (AS), and acrylonitrile-butadiene-styrene copolymers (ABS); vinyl chloride resins, polyurethane resins, phenol resins, epoxy resins, amino resins, and unsaturated polyester resins.

Examples of the general-purpose synthetic engineering plastic include polyester resins such as polyamide resins, polycarbonate resins, polyphenylene ether resins, modified polyphenylene ether resins, poly(ethylene terephthalate) (PET), and poly(butyrene terephthalate) (PBT); polyacetal resins, polysulfone resins, poly(phenylene sulfide) resins, and polyimide resins.

<Metal Salt of Phenylphosphonic Acid Compound>

The phenylphosphonic acid compound used in the metal salt of the phenylphosphonic acid compound used in the present invention is a compound of Formula [1]:

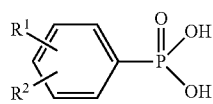

[1]

In the phenylphosphonic acid compound of Formula [1], $R^1$ and $R^2$ are each independently a hydrogen atom; a $C_{1-10}$ alkyl group; or a $C_{2-11}$ alkoxycarbonyl group. The $C_{2-11}$ alkoxycarbonyl group indicates an alkoxycarbonyl group whose number of carbons of the alkoxy group is 1 to 10.

Examples of the $C_{1-10}$ alkyl group in $R^1$ and $R^2$ include a methyl group, an ethyl group, an n-propyl group, an isopropyl group, an n-butyl group, an isobutyl group, and a tert-butyl group.

Examples of the $C_{2-11}$ alkoxycarbonyl group include a methoxycarbonyl group and an ethoxycarbonyl group.

Specific examples of the phenylphosphonic acid compound of Formula [1] include phenylphosphonic acid, 4-methylphenylphosphonic acid, 4-ethylphenylphosphonic acid, 4-n-propylphenylphosphonic acid, 4-isopropylphenylphosphonic acid, 4-n-butylphenylphosphonic acid, 4-isobutylphenylphosphonic acid, 4-tert-butylphenylphosphonic acid, 3,5-dimethoxycarbonylphenylphosphonic acid, 3,5-diethoxycarbonylphenylphosphonic acid, 2,5-dimethoxycarbonylphenylphosphonic acid, and 2,5-diethoxycarbonylphenylphosphonic acid.

Commercially available products of these compounds can be used favorably as they are.

Monovalent, divalent, and trivalent metals can be used for the metal forming the metal salt of the phenylphosphonic acid compound. Two or more types of metals may be used in combination.

Specific examples of the metal forming the metal salt include lithium, sodium, potassium, magnesium, calcium, barium, manganese, iron, cobalt, nickel, copper, silver, aluminum, and tin. Among the metal salts formed by these metals, preferable are a lithium salt, a potassium salt, a magnesium salt, a calcium salt, a manganese salt, an iron salt, a cobalt salt, a nickel salt, a silver salt, an aluminum salt, and a tin salt, and more preferable are a magnesium salt, a calcium salt, a manganese salt, a cobalt salt, and a silver salt.

As for the method for manufacturing the metal salt of the phenylphosphonic acid compound, it can be generally obtained as crystalline powder by, but not limited to, mixing a phenylphosphonic acid compound, a chloride, a sulfate, or a nitrate of the metal, and an alkali such as sodium hydroxide in water to react with each other to precipitate a metal salt of the phenylphosphonic acid compound, which is then filtered and dried. The metal salt of the phenylphosphonic acid compound can also be obtained by mixing a phenylphosphonic acid compound and an oxide, a hydroxide, a carbonate, or an organic salt of the metal to react with each other in water or an organic solvent, causing them to react with each other, and then filtering or evaporating the solvent, and drying.

The obtained powder is generally formed as a granular crystal, a plate-shaped crystal, a strip-shaped crystal, a rod-shaped crystal, or a needle-shaped crystal or may be formed to be a stack of these crystals.

When these compounds (crystalline powder) are commercially available, the commercially available products can be used.

In the formation of the metal salt of the phenylphosphonic acid compound, the molar ratio of the phenylphosphonic acid compound to the metal is generally, but not limited to, in terms of the molar ratio of phenylphosphonic acid compound/metal, preferably in a range of 1/100 to 2/1 or 1/2 to 2/1. The metal salt of the phenylphosphonic acid compound may contain metal source raw materials (chlorides, oxides, hydroxides, mineral acid salts, or organic acid salts of metals) which are surpluses in the reaction (which remain unreacted), but preferably, does not contain any free phenylphosphonic acid compound that does not form any salt.

The average particle diameter of the metal salt of the phenylphosphonic acid compound is preferably 10 μm or less, and more preferably 5 μm or less. The average particle diameter (μm) in the present invention means the average of the approximately maximum length of the minor axis of the particles. The size of the particles is described with the length (major axis), width (minor axis), and thickness thereof, and these figures satisfy the condition that <major axis≥minor axis≥thickness>. As the average diameter decreases, a crystallization rate tends to increase. Thus, a smaller average diameter is preferable In order to make the average particle diameter of the metal salt of the phenylphosphonic acid compound 10 μm or less, the crystalline powder obtained by the above method can be reduced to fine powder as needed by mixers having a shearing force such as homomixers, Henschel mixers, and Lodige mixers and dry crushing apparatuses such as ball mills, pin disc mills, pulverizers, inomizers, and counter jet mills. The crystalline powder can also be reduced to fine powder by wet crushing apparatuses such as ball mills, beads mills, sand grinders, and attritors using water, organic solvents mixable with water, or mixed solutions of these.

<Resin Composition>

The addition amount of the metal salt of the phenylphosphonic acid compound in the poly(3-hydroxyalkanoate) resin composition according to the present invention is 0.01 to 10 parts by mass, preferably 0.02 to 5 parts by mass, and more preferably 0.03 to 2 parts by mass with respect to 100 parts by mass of the P3HA resin. An addition amount of 0.01 parts by mass or more can achieve a sufficient crystallization rate. Because any addition amount exceeding 10 parts by mass does not increase the crystallization rate any more, 10 parts by mass or less is economically advantageous.

In the present invention, the method for adding the metal salt of the phenylphosphonic acid compound to the P3HA resin is not particularly limited, and addition can be performed by known methods.

For example, the P3HA resin and each component may be individually mixed by various mixers and be kneaded using a single-screw, a double-screw extruder or the like. The kneading is generally performed at temperatures of 10° C. to 200° C. A masterbatch containing each component in a high concentration may be prepared and added to the P3HA resin. The metal salt of the phenylphosphonic acid compound may be added at the step of the polymerization of the P3HA resin.

Known inorganic fillers may be used for the P3HA resin composition according to the present invention. Examples of the inorganic filler include glass fibers, carbon fibers, talc, mica, silica, kaolin, clay, wollastonite, glass beads, glass flakes, potassium titanate, calcium carbonate, magnesium sulfate, and titanium oxide. These inorganic fillers may be formed in any of a fibrous, granular, plate-like, needle-like, spherical, and powdery shape. These inorganic fillers can be used in an amount of 300 parts by mass or less with respect to 100 parts by mass of the P3HA resin.

Known flame retardants can be used for the P3HA resin composition according to the present invention. Examples of the flame retardant include halogen-based flame retardants such as bromine-based and chlorine-based ones; antimony-based flame retardants such as antimony trioxide and antimony pentaoxide; inorganic flame retardants such as aluminum hydroxide, magnesium hydroxide, and silicone-based compounds; phosphorus-based flame retardants such as red phosphorus, phosphoric acid esters, ammonium polyphosphate, and phosphazene; melamine-based flame retardants such as melamine, melam, melem, melon, melamine cyanurate, melamine phosphate, melamine pyrophosphate, melamine polyphosphate, melamine/melam/melem double polyphosphate, melamine alkylphosphonate, melamine phenylphosphonate, melamine sulfate, and melam methane sulfonate; and fluorine resins such as PTFE. These flame retardants can be used in an amount of 200 parts by mass or less with respect to 100 parts by mass of the P3HA resin.

Other than the above, various additives that are generally used in the manufacture of general synthetic resins may be used in combination; the additives include thermal stabilizers, photostabilizers, ultraviolet absorbers, antioxidants, impact modifiers, antistatic agents, pigments, coloring agents, mold release agents, lubricants, plasticizers, compatibilizers, foaming agents, perfumes, antibacterial and antifungal agents, various coupling agents such as silane-based, titanium-based, and aluminum-based ones, other various fillers, and other crystal nucleating agents.

When molding the P3HA resin composition according to the present invention, various molded products can be easily manufactured by adopting common molding methods such as general injection molding, blow molding, vacuum forming, and compression molding.

EXAMPLES

The present invention will be described more specifically below with reference to examples. The present invention is not limited to the description below.

The apparatus and condition used in sample preparation and property analysis are as follows:

Differential scanning calorimetry (DSC)

Apparatus: Diamond DSC manufactured by PerkinElmer Inc.

The abbreviations represent the following meanings:
PPA: Phenylphosphonic acid [manufactured by Nissan Chemical Industries, Ltd.]
PHBH: Poly((3-hydroxybutyrate)-co-(3-hydroxyhexanoate)) [weight average molecular weight 230,000, hydroxybutyrate unit/hydroxyhexanoate unit=89/11 (molar ratio) manufactured by Kaneka Corporation]
P3/4HB: Poly((3-hydroxybutyrate)-co-(4-hydroxybutyrate)) [Sogreen (trademark)-00A, 3-hydroxybutyrate unit/4-hydroxybutyrate unit=96/4 (molar ratio) manufactured by Tianjin GreenBio Materials Co., Ltd]
PPA-Zn: Zinc phenylphosphonate [Ecopromote (registered trademark) manufactured by Nissan Chemical Industries, Ltd.]

Synthesis Example 1

Synthesis of Magnesium Phenylphosphonate (PPA-Mg)

Into a reaction vessel equipped with a stirrer were charged 10.2 g (50 mmol) of magnesium chloride hexahydrate (manufactured by Wako Pure Chemical Industries, Ltd.) and 100 g of water, and the mixture was stirred to obtain a uniform solution. Next, to this solution being stirred at room temperature (about 25° C.), a solution in which 7.8 g (50 mmol) of PPA and 4.2 g (105 mmol) of sodium hydroxide had been dissolved in 68 g of water was added, and the resultant solution was stirred for additional 1 hour. The produced solid was filtered by vacuum filtration and was washed with water. The resultant wet product was dried at 200° C. for 6 hours to obtain target magnesium phenylphosphonate as white powder.

Synthesis Example 2

Synthesis of Calcium Phenylphosphonate (PPA-Ca) (1)

Operating in the same manner as in Synthesis Example 1 except that 7.4 g (50 mmol) of calcium chloride dihydrate (manufactured by Wako Pure Chemical Industries, Ltd.) was used in place of magnesium chloride hexahydrate, target calcium phenylphosphonate (1) was obtained as white powder.

A scanning electron microscope (SEM) [JSM-7400F manufactured by JEOL Ltd.] image of the resultant powder was observed. Particles of the powder were strip-shaped, and the average of the approximately maximum minor axis (where the size of the strip-shaped particle is represented by <length (major axis)×width (minor axis)×thickness>, and these figures satisfy <major axis≥minor axis≥thickness>) of 50 particles extracted at random was about 1 μm.

Synthesis Example 3

Synthesis of Manganese Phenylphosphonate (PPA-Mn)

Operating in the same manner as in Synthesis Example 1 except that 9.9 g (50 mmol) of manganese chloride tetrahydrate (manufactured by Wako Pure Chemical Industries, Ltd.) was used in place of magnesium chloride hexahydrate, target manganese phenylphosphonate was obtained as pale pink powder.

The resultant manganese phenylphosphonate, which was an anhydride immediately after being dried, changed to a monohydrate in an air atmosphere at room temperature (about 25° C.).

Synthesis Example 4

Synthesis of Cobalt Phenylphosphonate (PPA-Co)

Operating in the same manner as in Synthesis Example 1 except that 11.9 g (50 mmol) of cobalt chloride hexahydrate (manufactured by Wako Pure Chemical Industries, Ltd.) was used in place of magnesium chloride hexahydrate, target cobalt phenylphosphonate was obtained as purple powder.

Synthesis Example 5

Synthesis of Silver Phenylphosphonate (PPA-Ag)

Operating in the same manner as in Synthesis Example 1 except that 8.5 g (50 mmol) of silver nitrate (manufactured by Wako Pure Chemical Industries, Ltd.) was used in place of magnesium chloride hexahydrate, target silver phenylphosphonate was obtained as white powder.

Synthesis Example 6

Synthesis of Calcium Phenylphosphonate (PPA-Ca) (2)

Into a reaction vessel equipped with a stirrer were charged 10.0 g (100 mmol) of calcium carbonate [Escalon (trademark) #2300 manufactured by Sankyo Seifun Co., Ltd.] and 90 g of water to obtain uniform slurry. Next, a solution in which 15.8 g (100 mmol) of PPA had been dissolved in 72 g of water was added to this slurry being stirred at room temperature (about 25° C.), and the resultant slurry was stirred for additional 3 hours. The produced solid was filtered by vacuum filtration and was washed with water. The resultant wet product was dried at 200° C. for 6 hours to obtain target calcium phenylphosphonate (2) as white powder.

An SEM image of the resultant powder was observed. Particles of the powder were strip-shaped, and the average of the approximately maximum minor axis of 50 particles extracted at random was about 1 μm.

Synthesis Example 7

Synthesis of Calcium Phenylphosphonate (PPA-Ca) (3)

A wet product obtained in the same manner as in Synthesis Example 2 was further washed with acetone to remove water in the wet product. This wet product was dried under reduced pressure at 50° C. for 1 hour and was then dried at 200° C. for 6 hours to obtain target calcium phenylphosphonate (3) as white powder.

An SEM image of the resultant powder was observed. Particles of the powder were strip-shaped, and the average of the approximately maximum minor axis of 50 particles extracted at random was about 0.3 μm.

Synthesis Example 8

Synthesis of Calcium Carbonate that Contains Calcium Phenylphosphonate (PPA-Ca/Calcium Carbonate)

Into a reaction vessel equipped with a stirrer were charged 10.0 g (100 mmol) of calcium carbonate [Escalon (trademark) #2300 manufactured by Sankyo Seifun Co., Ltd.] and 90 g of water to obtain uniform slurry. Next, a solution in which 1.6 g (10 mmol) of PPA had been dissolved in 7 g of water was added to this slurry being stirred at room temperature (about 25° C.), and the slurry was stirred for additional 1 hour. The reaction mixture was filtered by vacuum filtration and was washed with water. The resultant wet product was dried at 200° C. for 6 hours to obtain target calcium carbonate that contains calcium phenylphosphonate as white powder. The content of calcium phenylphosphonate in the resultant powder was 18% by mass as a result of calculation based on the charging ratio of PPA and calcium carbonate.

Example 1

PHBH Resin Film that Contains PPA-Mg

One part by mass of PPA-Mg obtained in Synthesis Example 1 as the crystal nucleating agent was added to a solution in which 100 parts by mass of PHBH had been dissolved in 1,900 parts by mass of chloroform, and the mixture was stirred at room temperature (about 25° C.) for 3 hours to obtain a uniform dispersion liquid. This dispersion liquid was cast onto a glass petri dish, and the solvent was evaporated on a hot plate at 50° C. A piece of about 5 mg was cut out of the resultant PHBH resin film, and the crystallization behavior was evaluated using DSC. In the evaluation, after the temperature was raised up to 200° C. at a rate of 100° C./minute, maintained for 5 minutes, rapidly cooled to 60° C. at a rate of 100° C./minute, a time was measured as a half crystallization time ($t_{1/2}$) from the time when the temperature reached 60° C. until heat generation resulting from the crystallization of PHBH reached a peak. A smaller value of $t_{1/2}$ indicates a higher crystallization rate under the same condition and being more effective as a crystal nucleating agent. The result is shown in Table 1.

Example 2

PHBH Resin Film that Contains PPA-Ca (1)

Operating and evaluating in the same manner as in Example 1 except that PPA-Ca (1) obtained in Synthesis Example 2 was used in place of PPA-Mg, the result is shown in Table 1.

Example 3

PHBH Resin Film that Contains PPA-Mn

Operating and evaluating in the same manner as in Example 1 except that PPA-Mn obtained in Synthesis Example 3 was used in place of PPA-Mg, the result is shown in Table 1.

Example 4

PHBH Resin Film that Contains PPA-Co

Operating and evaluating in the same manner as in Example 1 except that PPA-Co obtained in Synthesis Example 4 was used in place of PPA-Mg, the result is shown in Table 1.

Example 5

PHBH Resin Film that Contains PPA-Ag

Operating and evaluating in the same manner as in Example 1 except that PPA-Ag obtained in Synthesis Example 5 was used in place of PPA-Mg, the result is shown in Table 1.

Comparative Example 1

PHBH Resin Film that Contains PPA-Zn

Operating and evaluating in the same manner as in Example 1 except that PPA-Zn was used in place of PPA-Mg, the result is shown in Table 1.

Comparative Example 2

PHBH Resin Film that Contains no Crystal Nucleating Agent

Operating and evaluating in the same manner as in Example 1 except that no crystal nucleating agent was used, the result is shown in Table 1.

TABLE 1

|  | Crystal nucleating agent | $t_{1/2}$ [second] |
|---|---|---|
| Example 1 | PPA-Mg | 280 |
| Example 2 | PPA-Ca (1) | 100 |
| Example 3 | PPA-Mn | 100 |
| Example 4 | PPA-Co | 340 |
| Example 5 | PPA-Ag | 430 |
| Comparative Example 1 | PPA-Zn | 680 |
| Comparative Example 2 | No addition | 770 |

It has been confirmed from the results of Table 1 that the examples using the specific metal salts of the phenylphosphonic acid compound as the crystal nucleating agents (Examples 1 to 5) show smaller $t_{1/2}$ than the example using the other metal salt of the phenylphosphonic acid compound (Comparative Example 1) and the example with no crystal nucleating agent added (Comparative Example 2) and have a crystallization promotion effect.

Example 6

PHBH Resin Composition that Contains PPA-Ca (2)

One part by mass of PPA-Ca (2) obtained in Synthesis Example 6 as a crystal nucleating agent was added to 100 parts by mass of PHBH, and the mixture was melt-kneaded at 140° C. for 5 minutes using a kneading and extruding tester [Laboplastmill micro KF-6V manufactured by Toyo Seiki Seisaku-sho, Ltd.] to obtain a PHBH resin composition. The crystallization behavior of the resultant resin composition was evaluated using DSC in the same manner as in Example 1. The result is shown in Table 2.

Example 7

PHBH Resin Composition that Contains PPA-Ca (3)

Operating and evaluating in the same manner as in Example 6 except that PPA-Ca (3) obtained in Synthesis Example 7 was used as a crystal nucleating agent, the result is shown in Table 2.

Example 8

PHBH Resin Composition that Contains PPA-Ca/Calcium Carbonate

Operating and evaluating in the same manner as in Example 6 except that PPA-Ca/calcium carbonate obtained in Synthesis Example 8 was used as a crystal nucleating agent, the result is shown in Table 2.

Comparative Example 3

PHBH Resin Composition that Contains PPA and Calcium Carbonate

Operating and evaluating in the same manner as in Example 6 except that 0.71 parts by mass of PPA and 0.45 parts by mass of calcium carbonate [Escalon (trademark) #2300 manufactured by Sankyo Seifun Co., Ltd.] (1 part by mass of PPA-Ca was produced through a complete reaction of PPA and calcium carbonate) were added separately as a crystal nucleating agent, the result is shown in Table 2.

Comparative Example 4

PHBH Resin Composition that Contains PPA and Zinc Stearate

Operating and evaluating in the same manner as in Example 6 except that 0.71 parts by mass of PPA and 2.85 parts by mass of zinc stearate [manufactured by Wako Pure Chemical Industries, Ltd.] (1 part by mass of PPA-Zn is produced through a complete reaction of PPA and zinc stearate) were added separately as a crystal nucleating agent, the result is shown in Table 2.

Comparative Example 5

PHBH Resin Composition that Contains no Crystal Nucleating Agent

Operating and evaluating in the same manner as in Example 6 except that no crystal nucleating agent was used, the result is shown in Table 2.

TABLE 2

|  | Crystal nucleating agent | Addition amount [part by mass] | $t_{1/2}$ [second] |
|---|---|---|---|
| Example 6 | PPA-Ca (2) | 1 | 60 |
| Example 7 | PPA-Ca (3) | 1 | 60 |
| Example 8 | PPA-Ca/calcium carbonate | 1 | 80 |
| Comparative Example 3 | PPA Calcium carbonate | 0.71 0.45 | 770 |
| Comparative Example 4 | PPA Zinc stearate | 0.71 2.85 | 540 |
| Comparative Example 5 | No addition | — | 780 |

The following was confirmed from the results of Table 2. That is, although containing calcium phenylphosphonate substantially in an amount of as small as 0.18 parts by mass, the example using calcium carbonate that contains calcium phenylphosphonate as the crystal nucleating agent (Example 8) shows much smaller $t_{1/2}$ than the example with no crystal nucleating agent added (Comparative Example 5), like the examples using 1 part by mass of calcium phenylphosphonate (Examples 6 and 7), and thus has a crystallization promotion effect.

The example in which PPA and calcium phenylphosphonate were separately added as the crystal nucleating agent (Comparative Example 3) and the example in which PPA and zinc stearate were separately added (Comparative Example 4) did not show an adequate crystallization promotion effect.

Example 9

P3/4HB Resin Composition that Contains PPA-Ca (1)

One part by mass of PPA-Ca (1) obtained in Synthesis Example 2 as a crystal nucleating agent was added to 100 parts by mass of P3/4HB, and the mixture was melt-kneaded at 170° C. for 5 minutes using a kneading and extruding tester [Laboplastmill micro KF-6V manufactured by Toyo Seiki Seisaku-sho, Ltd.] to obtain a P3/4HB resin composition. The crystallization behavior of the resultant resin composition was evaluated using DSC in the same manner as in Example 1. The result is shown in Table 3.

Comparative Example 6

P3/4HB Resin Composition that Contains no Crystal Nucleating Agent

Operating and evaluating in the same manner as in Example 9 except that no crystal nucleating agent was used, the result is shown in Table 3.

TABLE 3

|  | Crystal nucleating agent | $t_{1/2}$ [second] |
|---|---|---|
| Example 9 | PPA-Ca (1) | 8 |
| Comparative Example 6 | No addition | 48 |

It has been confirmed from the results of Table 3 that also for the P3/4HB resin the example using calcium phenylphosphonate as the crystal nucleating agent (Example 9) shows much smaller $t_{1/2}$ than the example with no crystal nucleating agent added (Comparative Example 6) and has a crystallization promotion effect.

As described above, adding the specific metal salt of the phenylphosphonic acid compound to the P3HA resin as the crystal nucleating agent can provide a P3HA resin composition with the crystallization rate of the P3HA resin increased and excellent in heat resistance and moldability.

The invention claimed is:
1. A poly(3-hydroxyalkanoate) resin composition comprising:
   a poly(3-hydroxyalkanoate) resin that is a copolymer of at least one monomer selected from the group consisting of 3-hydroxyhexanoate and 4-hydroxybutyrate, with 3-hydroxybutyrate; and
   a metal salt of a phenylphosphonic acid compound of Formula [1]:

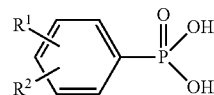

[1]

where $R^1$ and $R^2$ are each independently a hydrogen atom, a $C_{1-10}$ alkyl group, or a $C_{2-11}$ alkoxycarbonyl group,
   wherein the metal salt is at least one selected from the group consisting of a calcium salt and a manganese salt.
2. The poly(3-hydroxyalkanoate) resin composition according to claim 1, wherein the metal salt of the phenylphosphonic acid compound is contained in an amount of 0.01 to 10 parts by mass with respect to 100 parts by mass of the poly(3-hydroxyalkanoate) resin.

* * * * *